United States Patent
Lin

(10) Patent No.: US 11,127,140 B2
(45) Date of Patent: Sep. 21, 2021

(54) BACKGROUND IDENTIFICATION FOR VIDEOS WITH LARGE FOREGROUND OBJECTS

(71) Applicant: Samsung Electronics Co., Ltd., Suwon-si (KR)

(72) Inventor: Kaimo Lin, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 194 days.

(21) Appl. No.: 16/399,960

(22) Filed: Apr. 30, 2019

(65) Prior Publication Data

US 2020/0349717 A1   Nov. 5, 2020

(51) Int. Cl.
| G06T 7/194 | (2017.01) |
| G06T 7/215 | (2017.01) |
| G06K 9/00 | (2006.01) |

(52) U.S. Cl.
CPC .......... *G06T 7/194* (2017.01); *G06K 9/00744* (2013.01); *G06T 7/215* (2017.01); *G06T 2207/30241* (2013.01)

(58) Field of Classification Search
CPC ... H04N 19/553; H04N 19/156; H04N 7/0127
See application file for complete search history.

(56) References Cited

U.S. PATENT DOCUMENTS

| 7,650,011 | B2 | 1/2010 | Yang et al. |
| 9,635,276 | B2* | 4/2017 | Sen .......... G06T 7/215 |
| 9,710,716 | B2 | 7/2017 | Case et al. |
| 2011/0206124 | A1* | 8/2011 | Morphet .......... H04N 19/527 |
| | | | 375/240.16 |
| 2013/0243322 | A1 | 9/2013 | Noh et al. |
| 2017/0330050 | A1 | 11/2017 | Baltsen |
| 2018/0288433 | A1* | 10/2018 | Oh .......... H04N 7/0127 |

FOREIGN PATENT DOCUMENTS

| JP | 4596213 B2 | 12/2010 |
| KR | 101796558 B1 | 11/2017 |

OTHER PUBLICATIONS

Lin, Kaimo, "Robust Background Identification Method for Videos with Large Foreground Objects", May 2018, 8 pages.

* cited by examiner

*Primary Examiner* — Joshua L Schwartz

(57) ABSTRACT

The present disclosure describes a system and method for background identification for videos with large foreground objects. The method includes dividing a video clip into a multiple short video clips, each of which overlaps with neighboring short video clips of the multiple short video clips, detecting, in each short video clip, multiple background motion candidates, linking the background motion candidates between the neighboring short video clips to form multiple linked groups of background motion candidates, and identifying a linked group of background motion candidates that is most dominant among the multiple linked groups of background motion candidates.

20 Claims, 7 Drawing Sheets

BACKGROUND IDENTIFICATION FOR VIDEOS WITH LARGE FOREGROUND OBJECTS

TECHNICAL FIELD

This disclosure relates generally to computer vision. More specifically, this disclosure relates to a method and system for static background identification for videos with large foreground objects.

BACKGROUND

As mobile devices such as smartphones have become increasingly ubiquitous, the creation of dynamic video recordings by amateur videographers has increased accordingly. For various video applications such as video stabilization, stitching, and segmentation, the ability to identify static background portions of a video is important. For dynamic videos with a large portion of the foreground occupied by one or more moving foreground objects and a constantly changing background, existing strategies for static background identification mis-identify the background portions and over-segment the video into more than foreground and background objects.

SUMMARY

This disclosure provides a system and method for background identification in videos with large foreground objects.

In a first embodiment, a method includes dividing a video clip into a multiple short video clips, each of which overlaps with neighboring short video clips of the multiple short video clips, detecting, in each short video clip, multiple background motion candidates, linking the background motion candidates between neighboring short video clips to form multiple linked groups of background motion candidates, and identifying a linked group of background motion candidates that is most dominant among the multiple linked groups of background motion candidates.

In a second embodiment, a computing device includes a camera configured to record a video clip, and a processor. The processor is configured to divide a video clip into a multiple short video clips, each of which overlaps with neighboring short video clips of the multiple short video clips, detect, in each short video clip, multiple background motion candidates, link the background motion candidates between neighboring short video clips to form multiple linked groups of background motion candidates, and identify a linked group of background motion candidates that is most dominant among the multiple linked groups of background motion candidates.

In a third embodiment, a non-transitory computer readable medium embodies a computer program, the computer program comprising computer readable program code that when executed causes at least one processor to divide a video clip into a multiple short video clips, each of which overlaps with neighboring short video clips of the multiple short video clips, detect, in each short video clip, multiple background motion candidates, link the background motion candidates between neighboring short video clips to form multiple linked groups of background motion candidates, and identify a linked group of background motion candidates that is most dominant among the multiple linked groups of background motion candidates.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
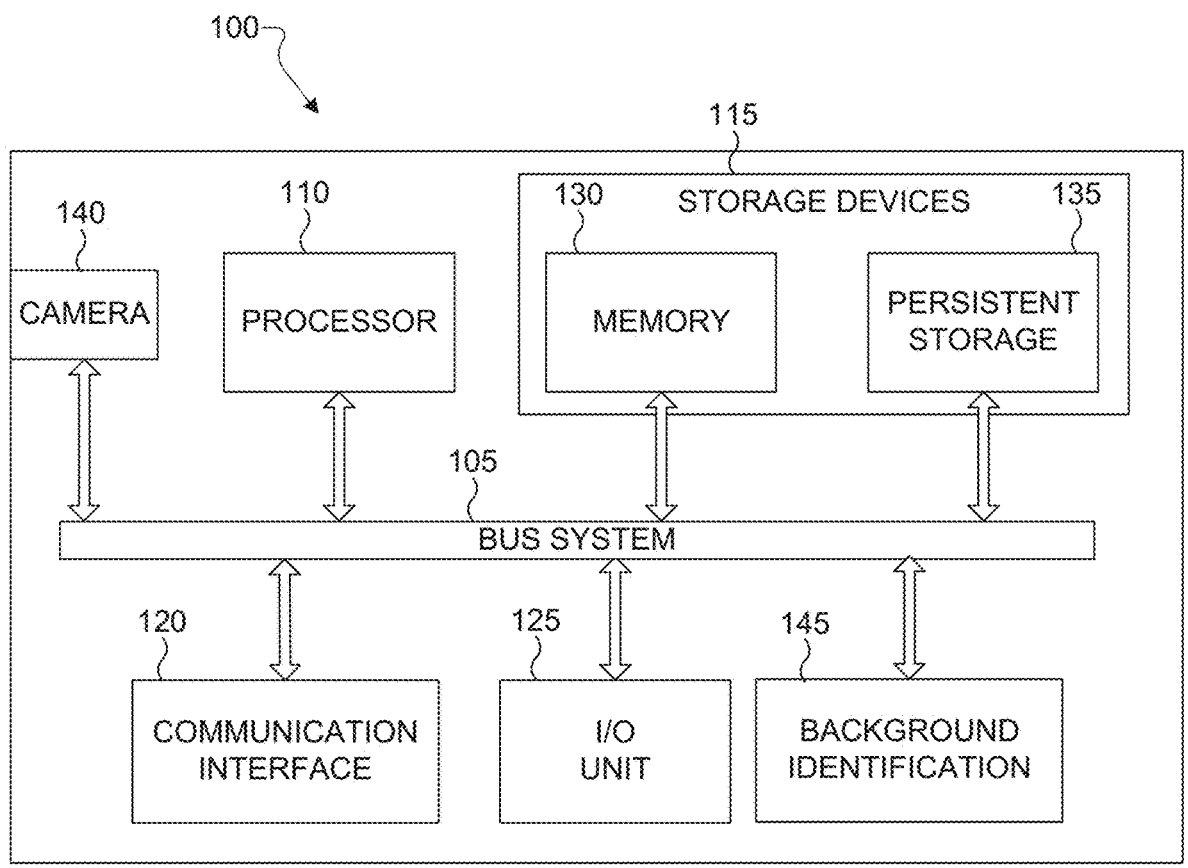
FIG. 1 illustrates an example computing device according to this disclosure.

FIGS. 1 through 6, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

The availability of mobile video cameras in the form of mobile devices such as smartphones has become increasingly ubiquitous, and as such there is a demand for these devices to produce high quality videos with minimal editing. The creation of dynamic videos, in particular, using mobile devices presents challenges. In this disclosure, "dynamic video" refers to a video created with a camera that is in motion relative to the surroundings, which constitute the background of the video. The present disclosure contemplates that identifying static background elements in a dynamic video is useful for various applications, such as video stabilization, stitching, and segmentation.

The present disclosure also contemplates that the subject matter of dynamic videos can present unique challenges. For example, when considering dynamic videos in which foreground objects occupy a majority of the frame, it is particularly difficult for computer vision to determine which portions of the video are the background and which are the foreground objects—this task will be referred to as segmentation of foreground objects from background objects. One common example of such a video is a person walking along with the camera facing themselves, where the person occupies a majority of the camera frame while the background of the video occupies a minority of the frame. This is a common scenario for modern mobile devices, which are often used in a self-facing mode to record video of the device's user while the user is walking or otherwise in transit while holding the device.

In this disclosure, "feature" refers to a distinct point on an object that is easily detected, such as a corner, and "rigid motion" refers to a 3D motion that includes 3D rotation, 3D translation, or combination of 3D rotation and 3D translation, without scaling. In the scenario where a foreground object occupies a majority of the frame, the background occupies a minority of the frame, and the camera is in motion, the background will be in motion relative to the camera while the foreground object will be largely static relative to the camera. Accordingly, if the video is broken down into rigid motion trajectories of features in each frame, background features should have cumulative rigid motion trajectories across frames of the video that are larger than cumulative rigid motion trajectories of foreground features across frames of the video.

It is assumed that background features will exhibit rigid motion because a camera itself moves with rigid motion, so when the camera frame is set as the frame of reference, static background features should appear to move with rigid motion relative to the camera frame. Some objects can be represented by a group of rigid motions. For example, the human body does not typically move with rigid motion, but movement of a particular part of a body (e.g., a leg, an arm, a head, etc.) can be approximated as rigid motion, and the movement of the body, therefore, can be approximated as a group of rigid motions.

Based on the above, a method of the present disclosure generates multiple short, overlapping video clips from a target video. The method detects rigid motions as background motion candidates using a local scanning scheme to allow identification of background motion that occurs in only a minority of the frame. The background motion candidates are linked between neighboring short video clips, and a linked group is identified that is the most dominant group across the whole set of short video clips (i.e., has the largest trajectory group). In some embodiments, linking is achieved using a directed graph where the background motion candidates are the nodes, and two nodes from neighboring short video clips are connected by an edge if they share common trajectories. A weight of the edge can be related to a size of the trajectory groups involved and their geometry fitting errors. All possible paths that traverse the directed graph from the first short video clip to the last short video clip can be searched, and an optimal path can be identified. This optimal path covers the largest number of feature trajectories, which is the set of feature trajectories that, as described above, is assumed to correspond to the background feature trajectories.

In some embodiments, a rigid motion model is defined as a set of epipolar geometries computed from neighboring video frames. Accordingly, videos with large depth variation can be handled without over segmentation. Over segmentation refers to a case in which multiple groups are identified which should all be included in one background group or one foreground group. In addition, these embodiments automatically encode motion segmentation and identification into a uniform framework.

FIG. 1 illustrates an example computing device 100 according to this disclosure. The computing device 100 could be used to perform background identification for dynamic videos, as will be further described below. In some embodiments, the computing device 100 could be a mobile device such as a smart phone. In some embodiments, the computing device 100 could comprise more than one device in a distributed computing arrangement.

The computing device 100 includes a bus system 105. The bus system 105 supports communication between at least one processor 110, at least one storage device 115, at least one communication interface 120, at least one input/output (I/O) unit 125, a camera 140, and a background identification unit 145.

The processor 110 executes instructions that may be loaded into a memory 130. The processor 110 can include any suitable number(s) and type(s) of processors or other devices in any suitable arrangement. Example types of processors 110 include microprocessors, microcontrollers, digital signal processors, field programmable gate arrays, application specific integrated circuits, and discrete circuitry.

The memory 130 and a persistent storage 135 are examples of storage devices 115, which represent any structure(s) capable of storing and facilitating retrieval of information (such as data, program code, and/or other suitable information on a temporary or permanent basis). The memory 130 represents a random access memory or any other suitable volatile or non-volatile storage device(s). The persistent storage 135 may contain one or more components or devices supporting longer-term storage of data, such as a read only memory, hard drive, Flash memory, or optical disc.

The communication interface 120 supports communications with other systems or devices. For example, the communication interface 120 could include a network interface card or a wireless communication unit facilitating communications over a network. The communication interface 120 can support communications through any suitable physical or wireless communication link(s).

The I/O unit 125 allows for input and output of data. For example, the I/O unit 125 provides a connection for user input through a keyboard, mouse, keypad, touchscreen, or other suitable input device. The I/O unit 125 also sends output to a display, printer, or other suitable output device.

The camera 140 allow for capture of video clips directly by the computing device 100. For example, when the computing device 100 is a mobile device, the computing device 100 could capture video using camera 140 and perform background identification within the computing device 100 without user interaction. In some embodiments, the computing device 100 receives a video clip through the communication interface 120 or the I/O unit 125 in addition to or instead of receiving a video clip from a camera 140.

The background identification unit 145 handles segmentation of the video clip into background and foreground portions, as will be further described below. The background identification unit 145 can separate a video into multiple short overlapping video clips, identify and segment feature trajectories within the short overlapping video clips to determine sets of rigid motions in each short overlapping video clip, identify common rigid motions between short overlapping video clips, and determine the background motion of the video based on paths of common rigid motions through a directed graph, as described further below. In some embodiments, the functions of the background identification unit 145 are implemented in the processor 110.

Although FIG. 1 illustrates an example computing device 100, various changes may be made to FIG. 1. For example, various components in FIG. 1 could be combined, further subdivided, or omitted and additional components could be added according to particular needs. As a particular example, the processor 110 could be divided into multiple processors, such as one or more central processing units (CPUs) and one or more graphics processing units (GPUs). In addition, computing devices can come in a wide variety of configurations, and FIG. 1 does not limit this disclosure to any particular system or device.

Figure 2:
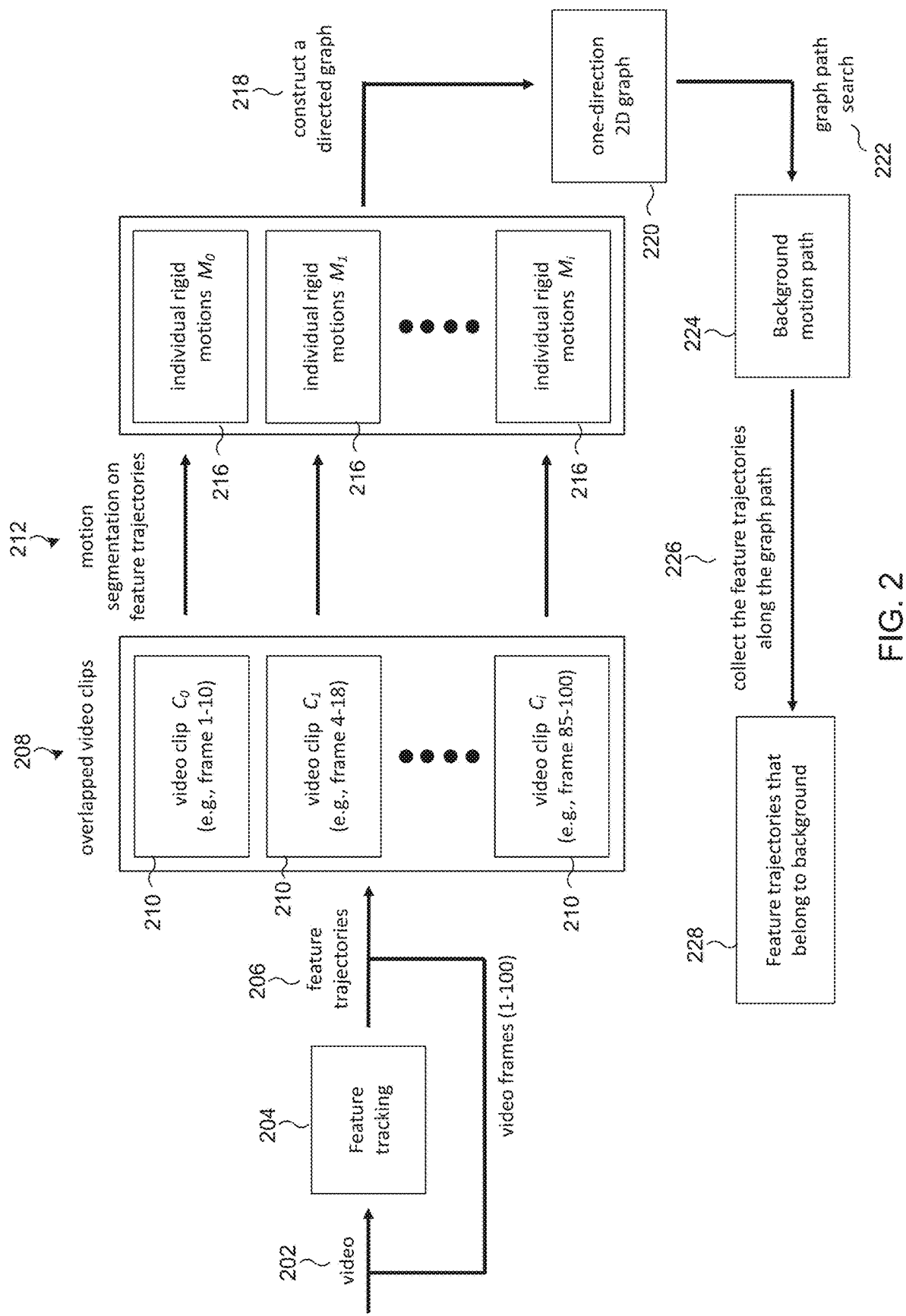
FIG. 2 illustrates an example method of background identification according to this disclosure.

FIG. 2 illustrates an example method of background identification according this disclosure. In some embodiments, the background identification of FIG. 2 is performed by the computing device 100 of FIG. 1.

A video 202 is received, for example from a camera such as camera 140, or as an input from another source. The video 202 is comprised of a number of frames, for example, 100 frames. At feature tracking step 204, feature trajectories are identified across frames of the video 202, as described further with respect to FIG. 3.

Figure 3:
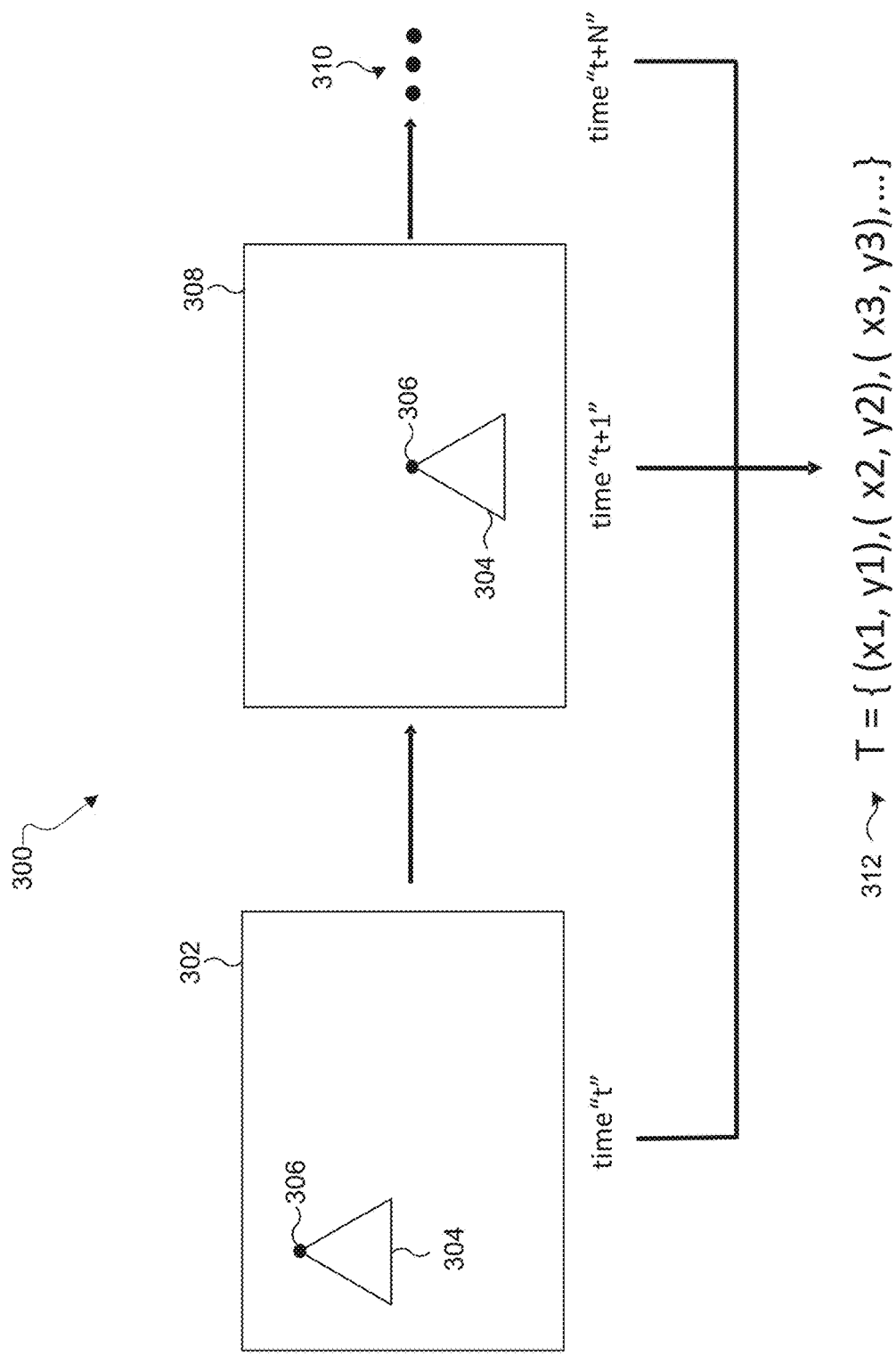
FIG. 3 illustrates an example of feature trajectory tracking according to this disclosure.

FIG. 3 illustrates an example of feature trajectory tracking according to this disclosure. For example, this could correspond to the feature tracking step 204 of FIG. 2. In some embodiments, feature trajectory tracking can be performed by the computing device 100, for example using the background identification unit 145.

A video 300 is illustrated as a series of frames 302, 308, 310, where frame 310 represents all additional frames in which a feature 306 is visible in the video. Each frame is a still picture, and a feature 306 is only visible within a time window [t, t+N] that has a total of N+1 frames. Beginning with frame 302, a feature 306 of an object 304 is identified at a location $(x_1, y_1)$. That same feature 306 is then identified in the subsequent frame 308 (corresponding to time t+1) at a new position $(x_2, y_2)$. In the same manner, the feature 306 is tracked across each of the remaining frames 310 to determine positions $(x_3, y_3), \ldots, (x_{N+1}, y_{N+1})$ of the feature. Each position is grouped together to form a feature trajectory 312 for the feature 306 across the frames of the video 300. The feature trajectory 312 is represented as $T=\{(x_1, y_1), (x_2, y_2), (x_3, y_3), \ldots, (x_{N+1}, y_{N+1})\}$.

Returning to FIG. 2, the set of feature trajectories 206 output from feature tracking step 204 can be denoted as $\{T_0, T_1, \ldots, T_i\}$. At step 208, multiple short video clips 210 are generated from the video 202 such that the short video clips 210 overlap. The video clips 210 can be different lengths. In some embodiments, the short video clips 210 are generated based on the motion model illustrated in FIG. 4.

Figure 4:
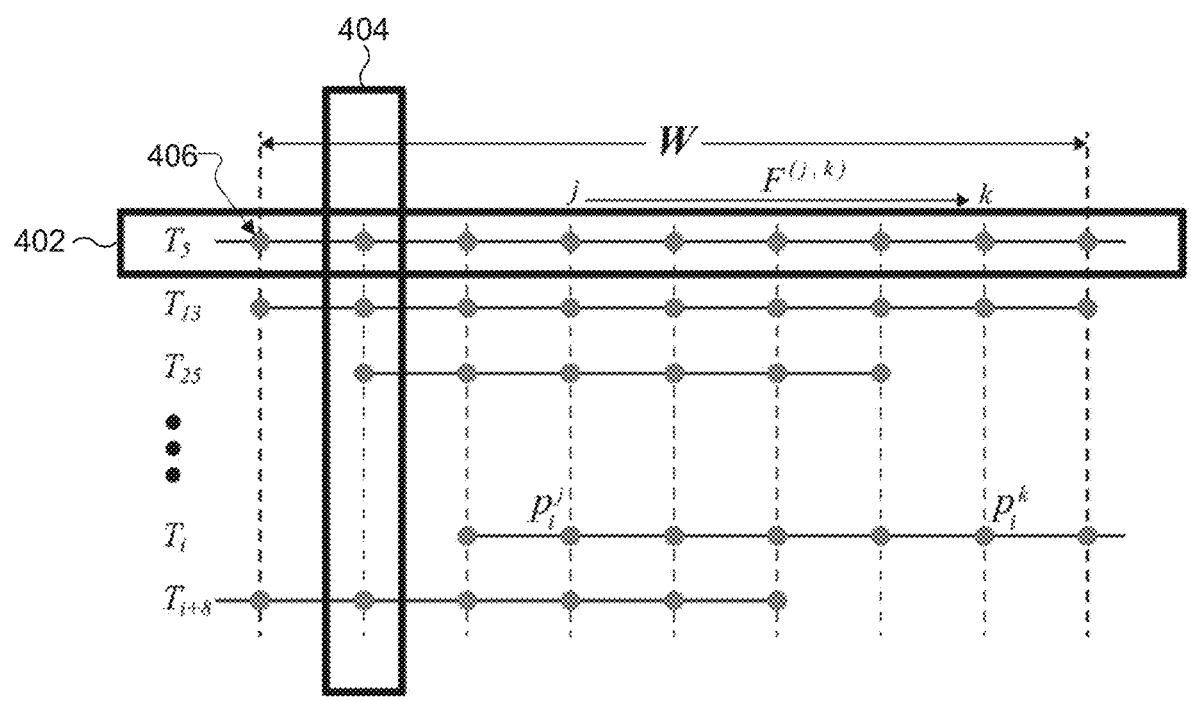
FIG. 4 illustrates an example trajectory-based motion model according to this disclosure.

FIG. 4 illustrates an example trajectory-based motion model according to this disclosure. The model is illustrated for a time window W of the video 202. A number of feature trajectories 402 are illustrated as they appear across a number of frames of the video 202. Each marker 406 indicates a feature that appears in a corresponding frame, and when a feature appears in neighboring frames, it forms a feature trajectory 402. For example, a feature corresponding to feature trajectory 402 $T_5$ appears in every frame of window W, meaning that the feature is visible for the entirety of the window W and that the feature trajectory 402 $T_5$ covers the whole window W. $T_5$ is therefore denoted as a "full-length feature trajectory." Multiple features can be tracked in any single frame, as illustrated by the set 404 of features within a frame.

Returning to FIG. 2, a short video clip 210 can be generated as follows. Beginning with a first frame, the window W comprising a first short video clip 210, which can be denoted as $C_0$, is expanded by adding consecutive frames of the video 202 to W so long as more than a predetermined threshold number of feature trajectories (e.g., 80% of feature trajectories) within W are full-length feature trajectories. When the threshold is no longer met (e.g., when less than 80% of the feature trajectories within W are full-length feature trajectories), the short video clip 210 is completed. Generation of the neighboring short video clip 210, denoted as $C_1$, then begins from the middle frame of the just-completed short video clip 210 $C_0$. The threshold number of feature trajectories is predetermined to achieve a balance between adequate camera movement within the short video clip 210 and adequate trajectory overlap with a next short video clip 210 to allow feature motion estimation. As a result, when there is little camera motion, long video clips will be generated, providing enough motion cues within a particular video clip for robust motion estimation.

After the video 202 has been divided into the multiple short video clips 210, rigid motion segmentation is performed on the short video clips 210 at step 212. For each video clip 210, denoted as $C_i$, a set of rigid motions 216 is determined, where the set can be denoted as $M_i$, and contains multiple rigid motions that can be denoted as $\{M_i^0, M_i^1, \ldots, M_i^m, \ldots\}$. For each video clip $C_i$, the initial frame is divided into overlapping cells with a uniform size L×L. In some embodiments, each cell could overlap 30% with its neighboring cells. For each cell, the full-length trajectories inside it are collected, and a best-fitting motion is estimated using random sample consensus (RANSAC). In each RANSAC iteration, eight full-length trajectories are randomly selected from inside the cell, and a rigid motion $M_i^m$ is estimated based on the eight selected trajectories, where the variable m represents an index of the individual cells of the short video clip $C_i$. In some embodiments, $M_i^m$ is computed as described below.

With reference once again to FIG. 4, a rigid motion M is defined by a set of feature trajectories $\{T_0, \ldots, T_i, \ldots\}$ within the window W. The rigid motion M is represented by a series of fundamental matrices $\{F^{(j,k)}\}_W^{0<|j-k|\leq r}$, where j and k are video frame indices in W. Here, r is predetermined to facilitate fundamental matrix estimation with acceptable feature tracking error. For example, r=5 could be used in some embodiments to obtain acceptable feature tracking error.

To decide if a particular feature trajectory $T_i$ belongs to a known rigid motion represented by $\{F^{(j,k)}\}_W^{0<|j-k|\leq r}$, the geometric errors of the feature trajectory $T_i$ are calculated based on the point-to-epipolar-line distance. Specifically, for each fundamental matrix $F^{(j,k)}$, if the feature of feature trajectory $T_i$ is visible at both frames j and k in window W, a feature match $(p_i^j, p_i^k)$ is extracted from the feature trajectory $T_i$, and a geometric error of $T_i$ is calculated with respect to $F^{(j,k)}$ as:

$$g(p_i^j, p_i^k, F^{(j,k)}) = d(p_i^k, F^{(j,k)} p_i^j), \quad (1)$$

where $p_i^j$ and $p_i^k$ are homogenous coordinates and d denotes the Euclidean point-to-line distance. If the geometric error $g(p_i^j, p_i^k, F^{(j,k)})$ is less than a threshold $\varepsilon_f$, then the feature match is determined to be a positive match for the rigid motion represented by $\{F^{(j,k)}\}_W^{0<|j-k|\leq r}$. In some embodiments, $\varepsilon_f=1.5$ can be used as a threshold. If a large majority of tested feature matches from feature trajectory $T_i$ are positive matches represented by $\{F^{(j,k)}\}_W^{0<|j-k|\leq r}$ (e.g., 90% or more positive matches), then $T_i$ is determined to be a member of the rigid motion.

Returning to FIG. 2, after the initial eight randomly selected trajectories are used to estimate the rigid motion $M_i^m$, the rest of the full-length trajectories inside the cell are considered, and inliers are counted. If the inliers of the final best-fitting motion exceed 80% of all the full-length trajectories within the cell, the estimated motion $M_i^m$ is considered to be a plausible background motion candidate for the short video clip $C_i$ (i.e., the rigid motion $M_i^m$ is considered to potentially represent motion of a background feature). In this embodiment, only full-length trajectories are used, as this allows computation of the rigid motion with only eight feature trajectories.

The above-described RANSAC model fitting can be performed for each of the individual cells to obtain the set of background motion candidates $M_i \ni \{M_i^0, M_i^1, \ldots, M_i^m, \ldots\}$ for the short video clip $C_i$. Since the background region of the video 202 may consist of several discrete parts across the image domain due to large dynamic foreground motions (i.e., when a large foreground object breaks the background up into several portions), and the estimated motions from the cells can be locally biased, the RANSAC model fitting process can additionally be performed on combinations of the single cells to obtain additional background motion candidates for the set $M_i$. For example, combinations of up to three single cells could be sufficient for robust background motion estimation. This method usually generates multiple overlapping background motion candidate groups. Since the background motion candidates are estimated from densely overlapping cells, there is a high chance that the background will be the majority of at least one of the cells, and thus the true background motion can be estimated.

Figure 5A:
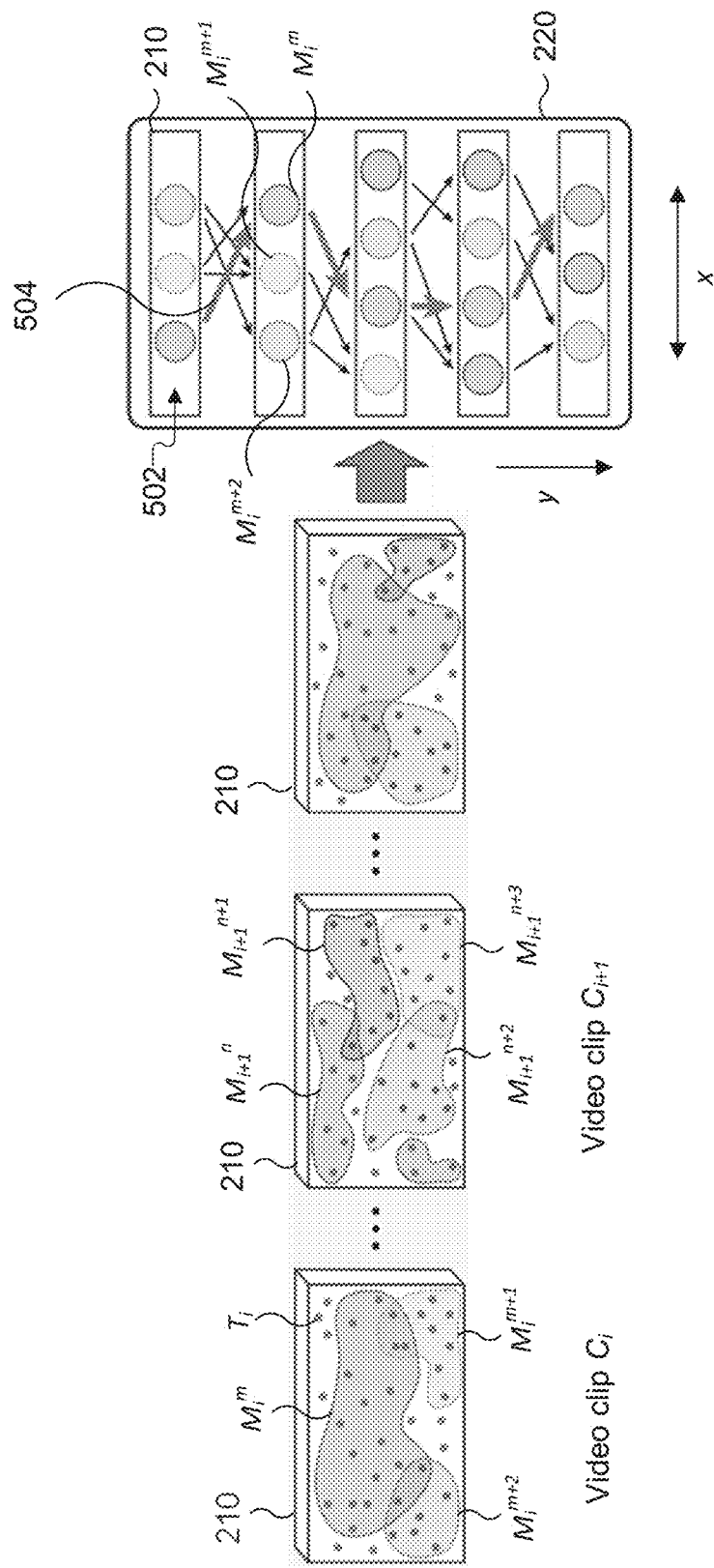
FIG. 5A illustrates an example an example 2D directed graph according to this disclosure.

At step 218, the rigid motions 216 are used to construct a two dimensional (2D) directed graph 220, where each rigid motion $M_i^m$ forms a node of the 2D directed graph. FIG. 5A illustrates an example 2D directed graph 220 according to this disclosure. The 2D directed graph 220 is comprised of nodes 502, where each node 502 corresponds to a set of rigid motions $M_i^m$, which are each background motion candidates. In this embodiment, a first dimension x of the 2D directed graph 220 corresponds to the nodes 502 within each video clip 210, and a second dimension y of the 2D directed graph 220 corresponds to progression through neighboring short video clips 210.

Figure 5B:
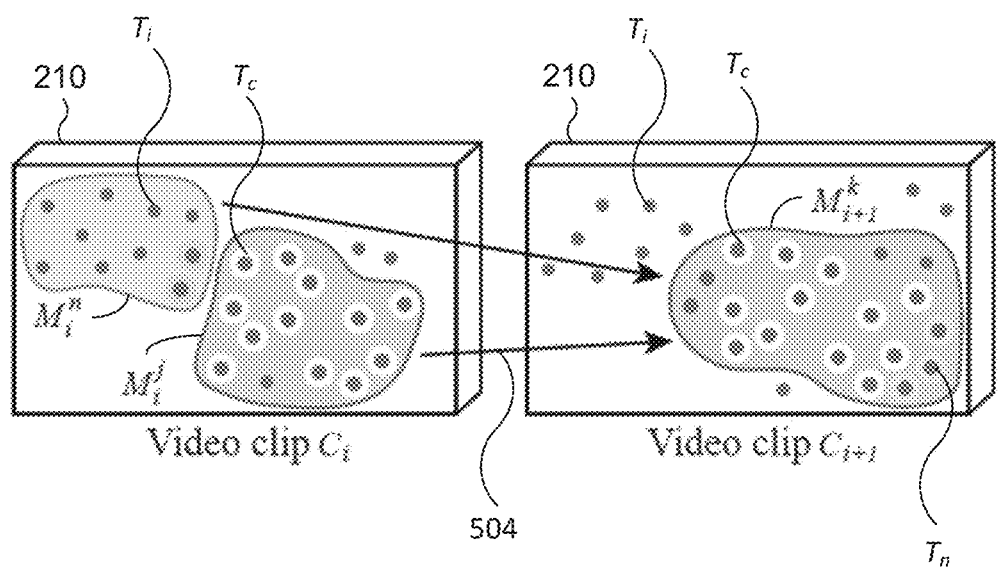
FIG. 5B illustrates an example pair of neighboring video clips according to this disclosure.

For each set of neighboring video clips 210 $C_i$ and $C_{i+1}$, a directed edge 504 is created between two background motion candidates (one in each neighboring video clip 210) if some common feature trajectories exist between them. Additionally, it is possible for each node 502 to be connected to multiple other nodes 502 in neighboring video clips 210. For example, FIG. 5B illustrates an example pair of neighboring video clips 210 $C_i$ and $C_{i+1}$ according to this disclosure. In this example, background motion candidates $M_i^n$ and $M_i^j$ of $C_i$ each share several feature trajectories T with background motion candidate $M_{i+1}^k$ of $C_{i+1}$.

After creating all of the directed edges 504 linking nodes 502 between neighboring video clips 210, multiple potential paths are created that traverse from the first video clip 210 to the last video clip 210. Referring again to FIG. 2, at step 226 an optimal path is sought which has the largest sum of feature trajectories along the path from the first video clip 210 to the last video clip 210. In some embodiments, as described below, a weighting factor is calculated and applied to the sum of feature trajectories to determine the optimal path. This optimal path corresponds to a dominant rigid motion across all of the video clips 210 (and thus across the video 202), and in turn the dominant rigid motion across all of the video clips 210 corresponds to the background motion 228.

A given feature trajectory $T_i$ can exist through multiple video clips 210, and may not always be a member of the motions along a single path. In order to better count the number of feature trajectories along the path, each feature trajectory $T_i$ is divided into N sub-trajectories, where N is the number of video clips 210 the feature trajectory $T_i$ spans. Each sub-trajectory is then assigned a normalization value $$v = \frac{1}{N}.$$

The number of feature trajectories along the path is then counted as follows.

In some embodiments, a weighting factor is calculated and applied for each directed edge 504 so as to favor edges with "strong" connections (i.e., those that have a larger number of shared feature trajectories) because a consistent background motion path should have as large of an overlap of feature trajectories between feature trajectory groups as possible. Referring to the example of FIG. 5B, for a directed edge 504 between $M_i^j$ and $M_{i+1}^k$, an edge weight $e_{i,i+1}^{j,k}$ is defined as:

$$e_{i,i+1}^{j,k} = \Sigma_c G(T_c, M_{i+1}^k) \cdot v_c + \Sigma_n G(T_n, M_{i+1}^k) \cdot v_n, \quad (2)$$

where $v_c$ are the values of sub-trajectories $T_c$ common to both $M_i^j$ and $M_{i+1}^k$ and $v_n$ are the values of sub-trajectories $T_n$ in $M_{i+1}^k$ that have newly appeared in video clip 210 $C_{i+1}$. For example, in FIG. 5B, there are 12 sub-trajectories common to both $M_i^j$ and $M_{i+1}^k$, 2 sub-trajectories common to $M_i^m$ and $M_{i+1}^k$ (which are disregarded here), and 3 sub-trajectories that have newly appeared in $C_{i+1}$.

$G(T_i, M)$ is a weighting term that reflects the geometric error of a sub-trajectory under a particular background motion candidate. It is defined as:

$$G(T_i, M) = \exp\left(-\frac{g_M^i \cdot g_M^i}{2\sigma^2}\right),\qquad(3)$$

where σ=0.15 and where $g_M^i$ is the average geometric error of feature trajectory $T_i$ under rigid motion M, as shown above in equation (1). When a background motion candidate is connected to two other rigid motions with a similar number of shared feature trajectories, equation (2) will favor the connection with the lower fitting error.

Given a starting background motion candidate $M_0^j$ in the first video clip 210 $C_0$ and an ending background motion candidate $M_q^k$ in a final video clip 210 $C_q$, the optimal motion path $P(M_0^j, M_q^k)$ from $M_0^j$ to $M_q^k$ is estimated that contains the largest number of feature trajectories by defining an objective function that maximizes directed edge weights as follows:

$$P(M_0^j, M_q^k) = \max_{(n,k)\in\Phi}\{P(M_0^j, M_{q-1}^n) + e_{q-1,q}^{n,k}\},\qquad(4)$$

where Φ is the set of connected directed edges from background motion candidates in video clip 210 $C_{q-1}$ to $M_q^k$. When q=1, $P(M_0^j, M_q^k) = e_{0,1}^{j,k} + \Omega(M_0^j)$, where $\Omega(M_0^j)$ is the sum of the values of the sub-trajectories inside $M_0^j$, weighted by their corresponding geometric errors as determined by equation (2).

The optimal motion path searching problem between a background motion candidate $M_0^m$ in $C_0$ and any other background motion candidate $M_i^m$ in $C_i$ can be solved by dynamic programming. Finally, a global optimal motion path $P_{dom}$ beginning from the first video clip 210 and ending at the last video clip 210 is defined as the following:

$$P_{dom} = \max_{j,k}\{P(M_0^j, M_{S-1}^k)\},\qquad(5)$$

where S is the total number of video clips 210. The optimal motion path $P_{dom}$ is the background motion candidate that is determined to be the background motion group. After obtaining the optimal motion path $P_{dom}$, the sub-trajectories inside the selected motion candidate are labeled as background motion 228 of the video 202.

In some embodiments, since a feature trajectory usually is visible through multiple video clips, and some motions of the optimal motion path $P_{dom}$ may be intermittent motion of the foreground objects or motion estimation errors, a temporal consistency check is performed for the trajectories of $P_{dom}$, and only reliable sub-trajectories are used to compute the epipolar geometries of the final global background motion. Specifically, from the background motion path, reliable background feature trajectories that are entirely covered by the path (i.e., feature trajectories for which all of their sub-trajectories are labeled as background) are identified. Then a global background motion model $M_{back}$ is computed as described with reference to equation (1) using only the reliable background feature trajectories. For this computation, the window W of $M_{back}$ covers the entire video 202. Finally, $M_{back}$ is used to label all of the feature trajectories in the video 202 as background feature trajectories or non-background feature trajectories.

Figure 6:
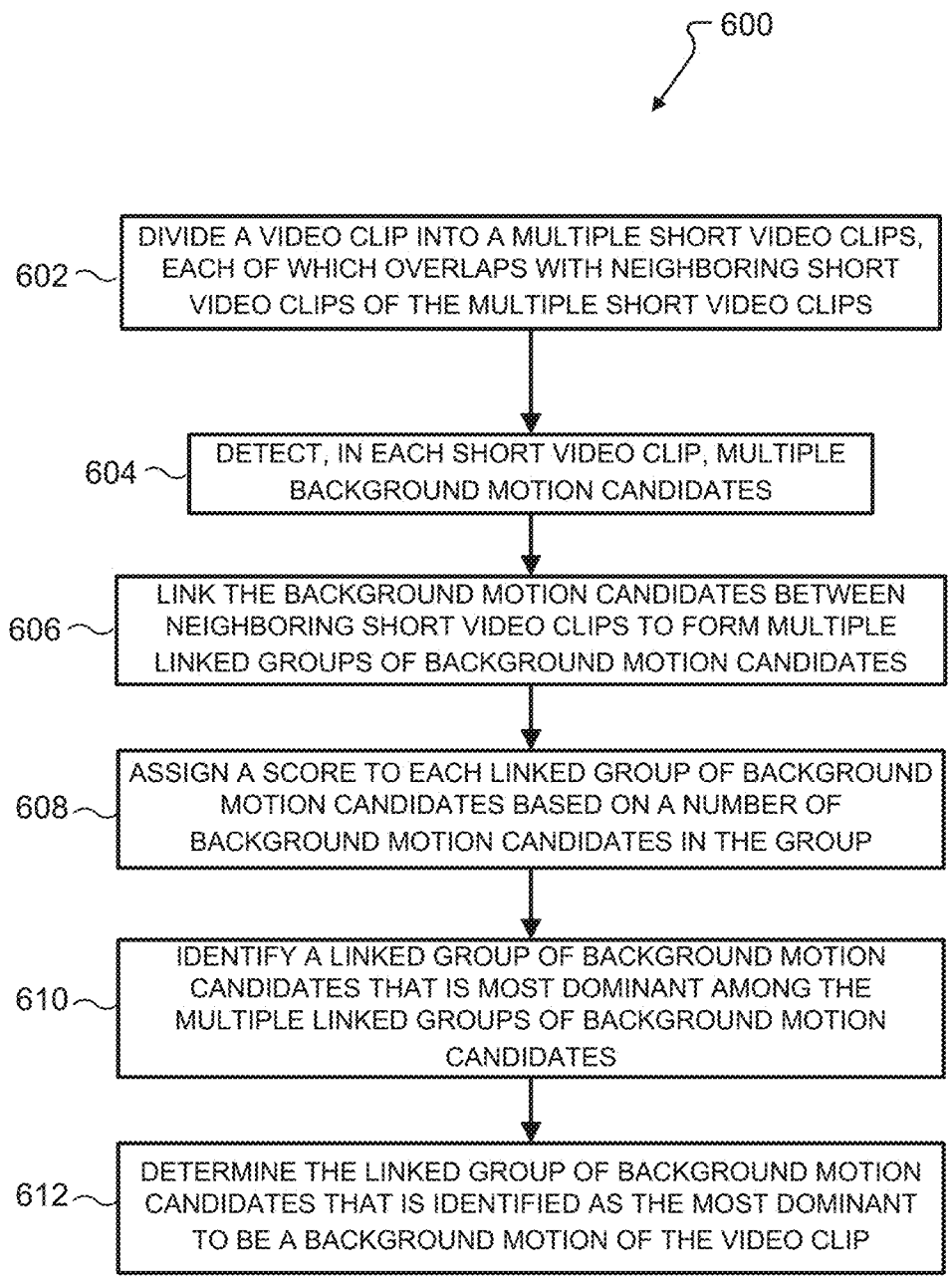
FIG. 6 illustrates an example method for identifying background features according to this disclosure.

FIG. 6 illustrates an example method 600 for identifying background features according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The method 600 could be performed by a computing device 100; however, it is understood that any suitable computing device could be used to perform the method.

Beginning at step 602, the computing device divides a video clip into multiple short video clips, each of which overlaps with neighboring short video clips of the multiple short video clips. At step 604, the computing device detects, in each short video clip, multiple background motion candidates. In some embodiments, each background motion candidate is a rigid motion, where a group of 3D points undergoes a common 3D rotation, 3D translation, or a combination of 3D rotation and 3D translation. Detecting the rigid motion can be done based on a set of 2D feature trajectories (2D projections of the 3D points) undergoing the same rigid motion across frames of the short video clip.

At step 606, the computing device links the background motion candidates between neighboring short video clips to form multiple linked groups of background motion candidates. This can include determining multiple sets of background motion candidates in each short video clip, where each of the multiple sets of background motion candidates is comprised of background motion candidates that have similar trajectories across frames of the respective short video clip, and linking, between the neighboring short video clips, sets that have common trajectories to form the multiple linked groups of background motion candidates.

At step 608, the computing device assigns a score to each linked group of background motion candidates based on a number of background motion candidates in the group. This can include weighting a number of background motion candidates in each linked group of background motion candidates. At step 610, the computing device identifies a linked group of background motion candidates that is most dominant among the multiple linked groups of background motion candidates, which can include identifying a linked group of background motion candidates that has a highest score. At step 612, the computing device determines the linked group of background motion candidates that is identified as the most dominant to be a background motion of the video clip.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method comprising:
dividing a video clip into multiple short video clips, each of which overlaps with one or more neighboring short video clips of the multiple short video clips;
detecting, in each short video clip, multiple background motion candidates;
linking the background motion candidates between the neighboring short video clips to form multiple linked groups of background motion candidates, wherein each linked group of background motion candidates includes a background motion candidate from each short video clip; and
identifying a linked group of background motion candidates from among the multiple linked groups of background motion candidates that corresponds to a dominant motion across the multiple short video clips.

2. The method of claim 1, wherein each of the multiple background motion candidates is a rigid motion.

3. The method of claim 2, wherein the rigid motion is a 3D rotation, 3D translation, or a combination of 3D rotation and 3D translation of a group of 3D points, the method further comprising:
detecting the rigid motion based on a group of 2D point trajectories, which are 2D projections of the 3D points, across frames of the short video clip.

4. The method of claim 1, wherein linking the background motion candidates between the neighboring short video clips further comprises:
determining multiple sets of background motion candidates in each short video clip, where each of the multiple sets of background motion candidates is comprised of background motion candidates that have trajectories undergoing a same rigid motion across frames of the respective short video clip; and
linking, between the neighboring short video clips, sets that have common trajectories to form the multiple linked groups of background motion candidates.

5. The method of claim 1, further comprising:
assigning a score to each linked group of background motion candidates based on a number of background motion candidates in the group,
wherein identifying the linked group of background motion candidates that corresponds to the dominant motion includes identifying a linked group of background motion candidates that has a highest score.

6. The method of claim 5, wherein assigning the score to each linked group of background motion candidates further comprises:
weighting the number of background motion candidates in each linked group of background motion candidates.

7. The method of claim 1, further comprising:
determining the linked group of background motion candidates identified as corresponding to the dominant motion to be a background motion of the video clip.

8. A computing device comprising:
a camera configured to record a video clip; and
a processor configured to:
divide the video clip into multiple short video clips, each of which overlaps with one or more neighboring short video clips of the multiple short video clips;
detect, in each short video clip, multiple background motion candidates;
link the background motion candidates between the neighboring short video clips to form multiple linked groups of background motion candidates, wherein each linked group of background motion candidates includes a background motion candidate from each short video clip; and
identify a linked group of background motion candidates from among the multiple linked groups of background motion candidates that corresponds to a dominant motion across the multiple short video clips.

9. The computing device of claim 8, wherein each of the multiple background motion candidates is a rigid motion.

10. The computing device of claim 9, wherein the rigid motion is a 3D rotation, 3D translation, or a combination of 3D rotation and 3D translation of a group of 3D points, the processor further configured to:
detect the rigid motion based on a group of 2D point trajectories, which are 2D projections of the 3D points, across frames of the short video clip.

11. The computing device of claim 8, wherein, to link the background motion candidates between the neighboring short video clips, the processor is further configured to:
determine multiple sets of background motion candidates in each short video clip, where each of the multiple sets of background motion candidates is comprised of background motion candidates that have trajectories undergoing a same rigid motion across frames of the respective short video clip; and
link, between the neighboring short video clips, sets that have common trajectories to form the multiple linked groups of background motion candidates.

12. The computing device of claim 8, wherein the processor is further configured to assign a score to each linked group of background motion candidates based on a number of background motion candidates in the group, and
wherein, to identify the linked group of background motion candidates that corresponds to the dominant motion, the processor is configured to identify a linked group of background motion candidates that has a highest score.

13. The computing device of claim 12, wherein, to assign the score to each linked group of background motion candidates, the processor is further configured to:
weight the number of background motion candidates in each linked group of background motion candidates.

14. The computing device of claim 8, wherein the processor is further configured to:
determine the linked group of background motion candidates identified as corresponding to the dominant motion to be a background motion of the video clip.

15. A non-transitory computer readable medium embodying a computer program, the computer program comprising computer readable program code that when executed causes at least one processor to:
divide a video clip into multiple short video clips, each of which overlaps with one or more neighboring short video clips of the multiple short video clips;
detect, in each short video clip, multiple background motion candidates;
link the background motion candidates between the neighboring short video clips to form multiple linked groups of background motion candidates, wherein each linked group of background motion candidates includes a background motion candidate from each short video clip; and
identify a linked group of background motion candidates from among the multiple linked groups of background motion candidates that corresponds to a dominant motion across the multiple short video clips.

16. The non-transitory computer readable medium of claim 15, wherein each of the multiple background motion candidates is a rigid motion.

17. The non-transitory computer readable medium of claim 16, wherein the rigid motion is a 3D rotation, 3D translation, or a combination of 3D rotation and 3D translation of a group of 3D points, the computer program further comprising computer readable program code that when executed causes the at least one processor to:
  detect the rigid motion based on a group of 2D point trajectories, which are 2D projections of the 3D points, across frames of the short video clip.

18. The non-transitory computer readable medium of claim 15, wherein the computer readable program code that when executed causes the at least one processor to link the background motion candidates between the neighboring short video clips comprises computer readable program code that when executed causes the at least one processor to:
  determine multiple sets of background motion candidates in each short video clip, where each of the multiple sets of background motion candidates is comprised of background motion candidates that have trajectories undergoing a same rigid motion across frames of the respective short video clip; and
  link, between the neighboring short video clips, sets that have common trajectories to form the multiple linked groups of background motion candidates.

19. The non-transitory computer readable medium of claim 15, wherein the computer program further comprises computer readable program code that when executed causes the at least one processor to assign a score to each linked group of background motion candidates based on a number of background motion candidates in the group, and
  wherein the computer readable program code that when executed causes the at least one processor to identify the linked group of background motion candidates that corresponds to the dominant motion includes computer readable program code that when executed causes the at least one processor to identify a linked group of background motion candidates that has a highest score.

20. The non-transitory computer readable medium of claim 15, wherein the computer program further comprises computer readable program code that when executed causes the at least one processor to:
  determine the linked group of background motion candidates identified as corresponding to the dominant motion to be a background motion of the video clip.

* * * * *